(12) United States Patent
Hevey et al.

(10) Patent No.: US 6,186,661 B1
(45) Date of Patent: Feb. 13, 2001

(54) SCHMIDT-BOELTER GAGE

(75) Inventors: Stephen J. Hevey; Lawrence W. Langley, both of Blacksburg, VA (US)

(73) Assignee: Vatell Corporation, Christiansburg, VA (US)

( * ) Notice: Under 35 U.S.C. 154(b), the term of this patent shall be extended for 0 days.

(21) Appl. No.: 09/151,786

(22) Filed: Sep. 11, 1998

(51) Int. Cl.[7] .................................................. G01K 17/08
(52) U.S. Cl. .................... 374/29; 374/21; 374/30
(58) Field of Search .................. 374/29, 31, 80

(56) References Cited

U.S. PATENT DOCUMENTS

| | | | |
|---|---|---|---|
| 1,528,383 | * | 3/1925 | Schmidt ................... 374/30 |
| 3,607,445 | * | 9/1971 | Hilnes ..................... 374/29 |
| 4,541,728 | * | 9/1985 | Hauser et al. ............ 374/29 |
| 4,779,994 | * | 10/1988 | Diller et al. ............. 374/29 |
| 4,812,050 | * | 3/1989 | Epstein et al. ........... 374/29 |
| 4,993,842 | * | 2/1991 | Morimoto et al. ........ 374/29 |
| 5,326,642 | * | 7/1994 | Moreen .................... 428/469 |

FOREIGN PATENT DOCUMENTS

0162981 * of 1964 (SU) ....................... 374/29

OTHER PUBLICATIONS

M.C. Ziemke, Heat Flux Transducers, Instruments and Control Systems, vol. 40, p. 65,86, 87. Dec. 1967.*

C.T.Kidd et al., How the Schmidt–Boelter gage really works, Micro Craft Technology, Arnold Engineering Development Center, Arnold Air Force Base, TN 37389 (No Dates).*

* cited by examiner

*Primary Examiner*—G. Bradley Bennett
*Assistant Examiner*—Gail Verbitsky

(57) ABSTRACT

An improved Schmidt-Boelter heat flux gage is disclosed in which the heat absorbed by the top windings of the gage is removed from the ends of the thermally resistive wafer instead of through the bottom windings. This arrangement results in greatly improved transient response with little or no loss of sensitivity. The thermally resistive wafer is formed of an electrically insulating material with high thermal conductivity such as aluminum nitride.

6 Claims, 6 Drawing Sheets

SCHMIDT-BOELTER GAGE

BACKGROUND OF THE INVENTION

This invention relates to instruments for measuring heat flux, the rate of transfer of heat energy per unit area.

The Schmidt-Boelter gage, as described in U.S. Pat. No. 1,528,383 issued to E. Schmidt, is a widely accepted measuring instrument for heat flux. It combines high output, small size and good linearity with wide dynamic range. One of its limitations for high speed aero-thermal research is a relatively long response time to rapidly changing heat flux. Attempts by others to improve the response of this gage have encountered two obstacles; the gage output decreases as its response is improved, and the response characteristic exhibits two different time constants. Analysis of the gage output at frequencies close to the frequencies represented by these time constants is difficult or impossible.

Conventional Schmidt-Boelter gage construction and operation are well described by Kidd and Nelson in their monograph *How the Schmidt-Boelter Gage Really Works*, published by Arnold Engineering Development Center in 1996. FIG. 1, taken from that publication, illustrates typical gage construction. The measuring element is a thermally resistive wafer of aluminum which has been anodized over its entire outer surface to prevent electrical contact with the metallic core during fabrication. The insulated wafer is spirally wound with 35 to 40 turns of 0.051 mm diameter Constantan wire. Then the wound wafer is dipped in a copper plating solution, with the liquid surface approximately on the line A—A. Passage of electroplating current through the wire into the solution causes copper to be deposited on the immersed half of the windings. This makes each turn into a thermocouple pair, with one copper-Constantan (Type T) thermocouple junction on each side of the wafer. The wafer is then cemented into an anodized aluminum housing, its top surface is coated with epoxy, and connections are made to the fine wire. During the encapsulation process it is important to achieve void-free thermal contact between the windings on the bottom of the wafer and the epoxy encapsulant.

When heat flows through the mounted wafer from top to bottom a temperature difference is created across it, and the output voltages of the upper thermocouple junctions become slightly greater than those of the lower junctions. The output voltage across the terminals of the device is the sum of these small voltage differences, and is proportional to the heat flux passing through the wafer.

The thermal time constant of a Schmidt-Boelter gage constructed in this manner will be between 20 and 100 milliseconds. When faster response is needed, the wafer may be made very thin. Time constants of 15 to 20 milliseconds may readily be obtained in this manner. Unfortunately, the response of such gages cannot be improved further without incurring the penalty of second order behavior. Typically, the output of the gage will rise rapidly with a first time constant, and then rise more slowly with a second, longer time constant.

Why does the conventional Schmidt-Boelter behave in this manner? Our analysis indicates that heat passing through the thermally resistive wafer encounters five separate layers of materials with very different thermal properties. The first layer is made up of the upper windings, imbedded in epoxy. The second layer is the alumina created by anodization. The third layer is the wafer of aluminum metal. The fourth layer is alumina created by anodization, and the fifth layer is the bottom windings and epoxy which holds them in place. The temperature difference between the upper and lower windings is actually measured across the middle three elements, two layers of alumina and one of aluminum metal. The sensitivity and the transient response of the gage are mainly produced by the thermal resistance of the two alumina layers.

Measurement of the thermal resistance of an anodized (alumina) layer has proven to be very difficult. About the only conclusion we are confident of is that the resistance is much higher than the bulk properties of alumina would predict. It may be that the stresses between highly crystalline alumina, which has low thermal expansion, and the base metal, which has high thermal expansion, create a physical structure with many dislocations and a rough surface. For whatever reason, the result is a very high thermal resistance.

Further Development of the Schmidt-Boelter

We started our attempts to improve on the Schmidt-Boelter gage by selecting different materials for the thermal resistance element and the housing. Aluminum nitride, which has almost the same thermal conductivity as the base metal, but is also an excellent electrical insulator, was used for the thermal resistance element, and copper for the housing.

We wound wafers of 0.51 mm thick aluminum nitride with 0.025 mm diameter Constantan wire and plated the windings in the same manner as in conventional gages encapsulated in epoxy, coating the top with material having high absorptivity for infrared radiation. The result was essentially the same as reported by others for anodized aluminum gages. The gage response was second order, and we could only achieve time constants of 20 milliseconds or greater.

Attempting to shorten the time constants, we reduced the thickness of the aluminum nitride to 0.25 mm, and constructed gages in the same manner. While there was a small reduction in the time constant, second order behavior still dominated the response.

We then constructed gages with two 0.25 mm thick wafers of aluminum nitride, the top wafer wound and plated as before, and the bottom wafer pressed firmly up against the windings on the back of the top wafer. Our hope was that the bottom wafer would remove heat more rapidly from the windings. This, too was a failure—second order behavior dominated, and there was no great improvement in response.

During this series of experiments we went to a great deal of trouble to make good thermal contact with the back of the wafer, so that there would be a low thermal resistance pathway for heat leaving the wafer. The difficulty in doing this was that the ends of the winding exiting the back of the wafer had to be insulated from the copper housing and connected to larger wires that could withstand some handling. There were always some voids between the back of the wafer and the epoxy layer under it.

We also observed that the response of the experimental gages was very poor if the ends of the aluminum nitride wafer were not firmly pressed down onto a flat surface of the copper housing during the epoxy curing. By mistake we constructed a gage on a 0.25 mm aluminum nitride wafer with the back of the wafer not embedded in epoxy. The output signal of this gage was lower than that of some previous gages, it was very fast and totally first order. The signal it produced is shown in FIG. 5.

What we had discovered is that with the uniformly high thermal conductivity of an aluminum nitride thermally resistant wafer, and without surface layers of polycrystalline alumina, conduction of heat from the ends of the wafer was sufficient to control the temperature of the back windings. The only thermal resistance affecting the gage response was that of the front windings with their epoxy layer. If we designed the gage to have good thermal contact between the housing and the ends of the aluminum nitride wafer, it would have very fast response and only one time constant. This result went squarely against the teachings of previous Schmidt-Boelter heat flux gage designers.

DESCRIPTION OF THE PREFERRED EMBODIMENT OF THE INVENTION

Figure 1A:
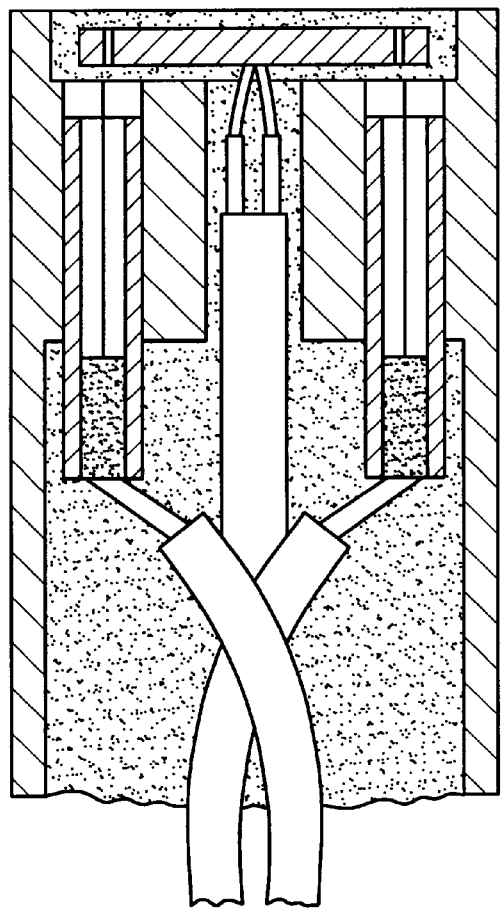
FIG. 1 is a copy of FIG. 3 from *How the Schmidt-Boelter Gage Really Works,* by Kidd and Nelson
Figure 1B:
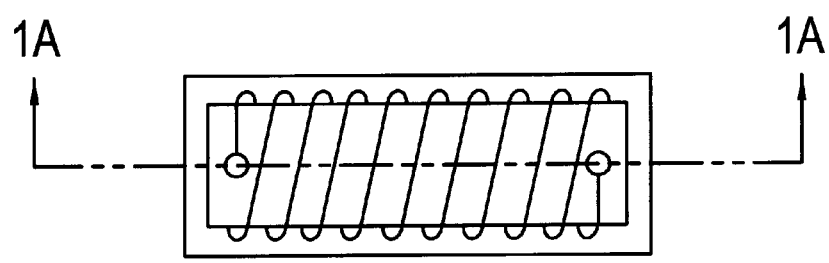
Figure 2:
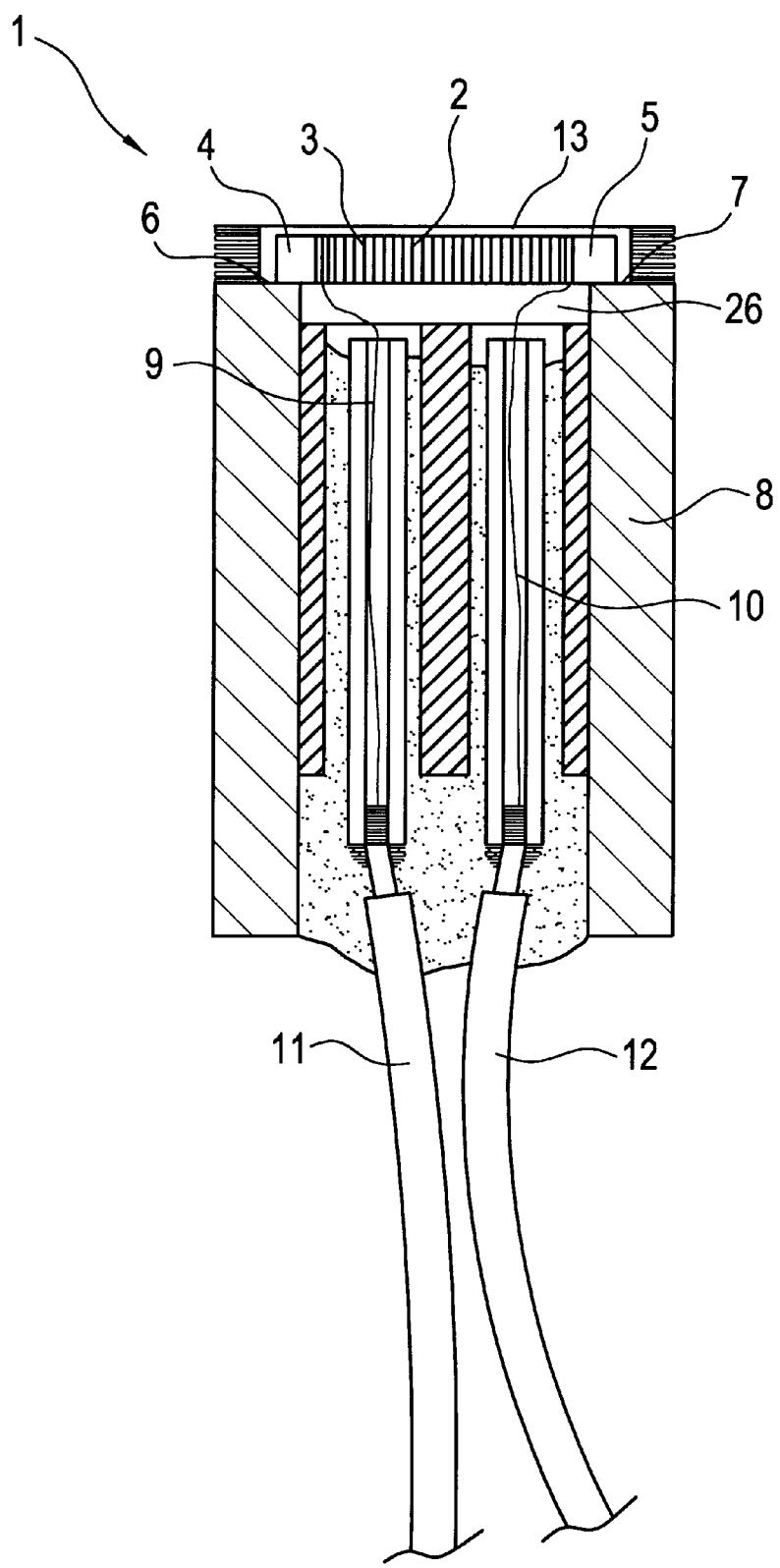
FIG. 2 is a sectional view of the preferred embodiment of the invention.

FIG. 2 shows how the improved Schmidt-Boelter gage 1 is constructed. A rectangular wafer 2 of Aluminum Nitride is wound over the middle part of its length with a spiral winding 3 of Constantan wire. The spiral winding is electrolytically plated over approximately half of each turn with a layer of pure copper, creating a pair of type T junctions from each turn, one on the top and one on the bottom of the wafer. Ends 4 and 5 of the aluminum nitride wafer 2 are placed in good thermal contact with flat surfaces 6 and 7 of a copper housing body 8. Leads 9 and 10 of the spiral winding 3 are soldered to connecting wires 11 and 12. A thin layer 13 of thermally conductive epoxy is applied to the top windings on the wafer 2 to hold them in place and protect them from abrasion. The bottom of the spiral winding 3 is left uncoated and insulated by an air space 26. The top of the spiral winding may be coated with a layer 27 of material having high absorptivity for infrared radiation.

The fabrication process for the improved Schmidt-Boelter gage is similar to the process which has been employed for many years. The differences, which are critical to performance, are the use of aluminum nitride for the wafer, and heat sinking the wafer at the ends only.

Figure 3:
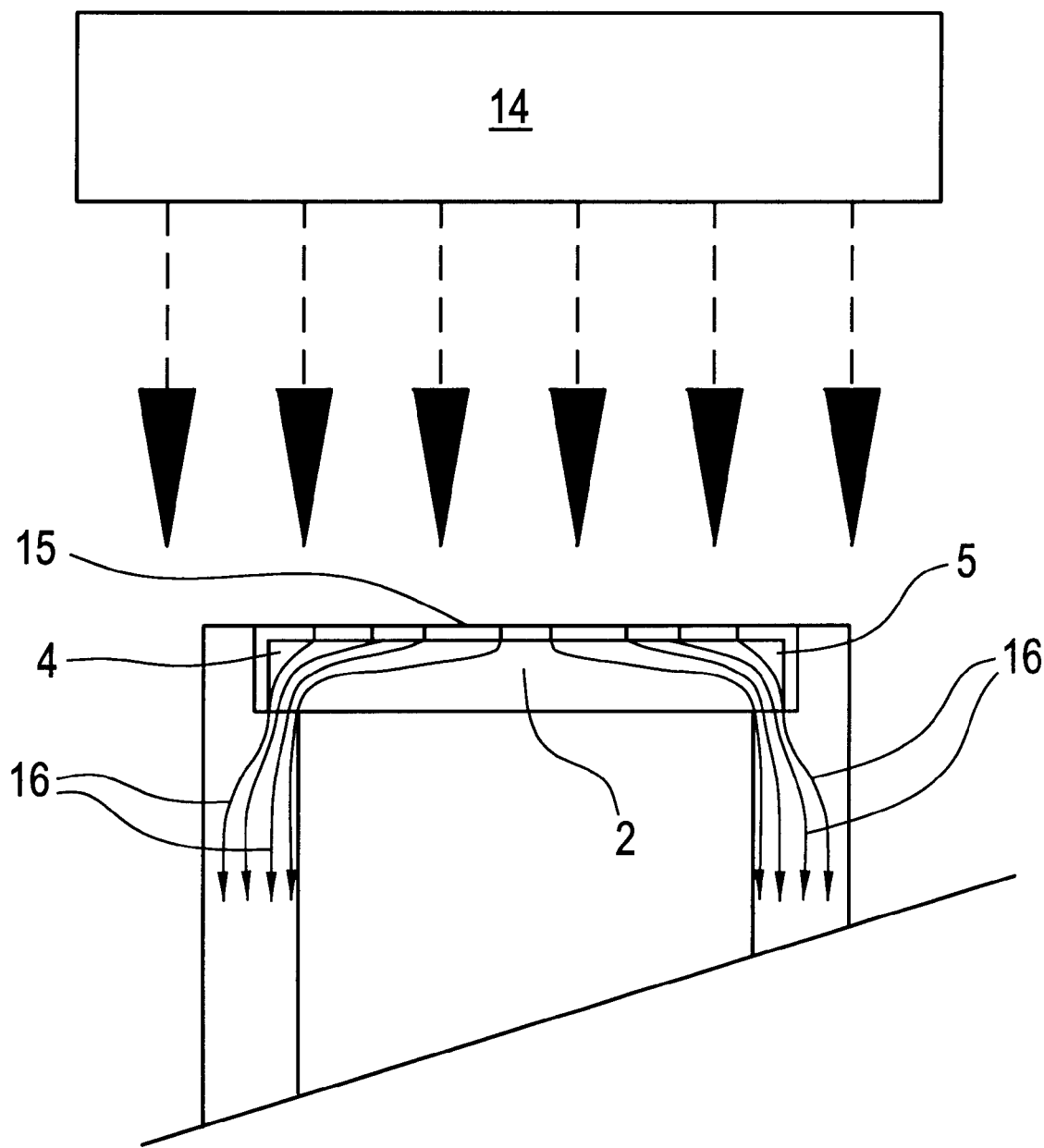
FIG. 3 is a sectional view of part of the preferred embodiment of the invention, illustrating the paths of heat flow which create the temperature differences measured by the windings.

The paths for heat through the improved Schmidt-Boelter gage are illustrated in FIG. 3. A radiant source 14 uniformly illuminates the top 15 of the gage, raising the temperature of the top surface of spiral winding 3 slightly. Heat flows from the windings into the aluminum nitride wafer 2, following the pathways indicated by lines 16. The temperature of the bottom of the spiral winding 3 is increased only slightly by passage of heat laterally towards the ends 4 and 5 of the wafer 2. The temperature difference across each individual turn of the spiral winding 3 is proportional to the flow rate of heat through the top 15 of the gage. Each turn develops a voltage equal to the difference between the output of its top thermocouple and its bottom thermocouple, as in previous Schmidt-Boelter gages. The voltage across the ends 9 and 10 of the spiral winding is the sum of individual winding voltages, and is proportional to the heat flux entering the top 15 of the gage.

Figure 4:
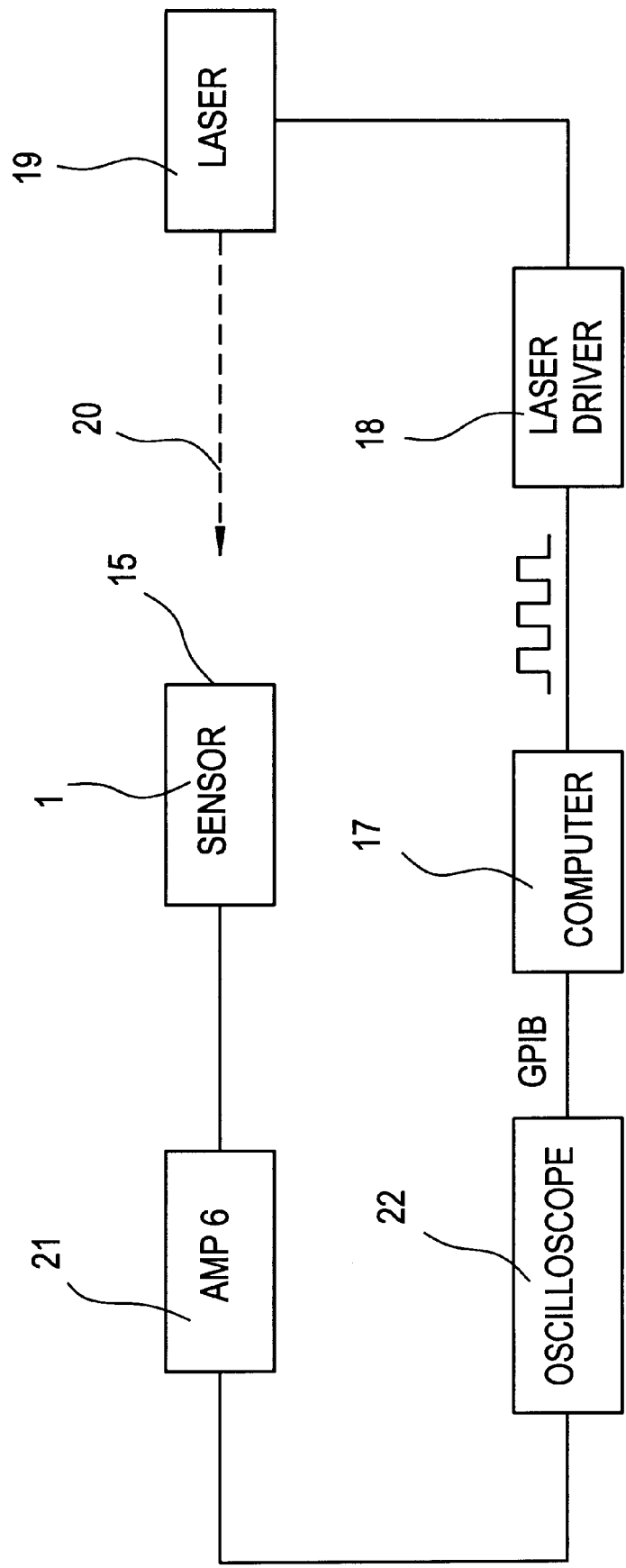
FIG. 4 illustrates a heat flux testing system used to measure the transient response of the preferred embodiment of the invention.

To measure the transient response of the improved Schmidt-Boelter gage, it is necessary to illuminate the gage with a source of heat flux which rapidly increases and decreases in magnitude. A heat sink must be provided for removal of the heat which enters the top of the gage. This is usually a block of copper into which the gage body is imbedded. A heat flux testing system embodying these features is illustrated in FIG. 4. A computer 17, generating square waves, is connected to a laser power amplifier 18, which, in turn, drives a solid state laser 19. The beam 20 of the laser is optically coupled to the top surface 15 of the improved Schmidt-Boelter gage 1. The output voltage of the gage is amplified by a wideband voltage amplifier 21 and displayed on an oscilloscope 22. The heat flux produced by the laser 19 rises and falls rapidly in response to the voltage of laser power amplifier 18. Transient response of the improved Schmidt-Boelter gage may be measured by observing and storing the waveform it produces on oscilloscope 22.

Figure 5:
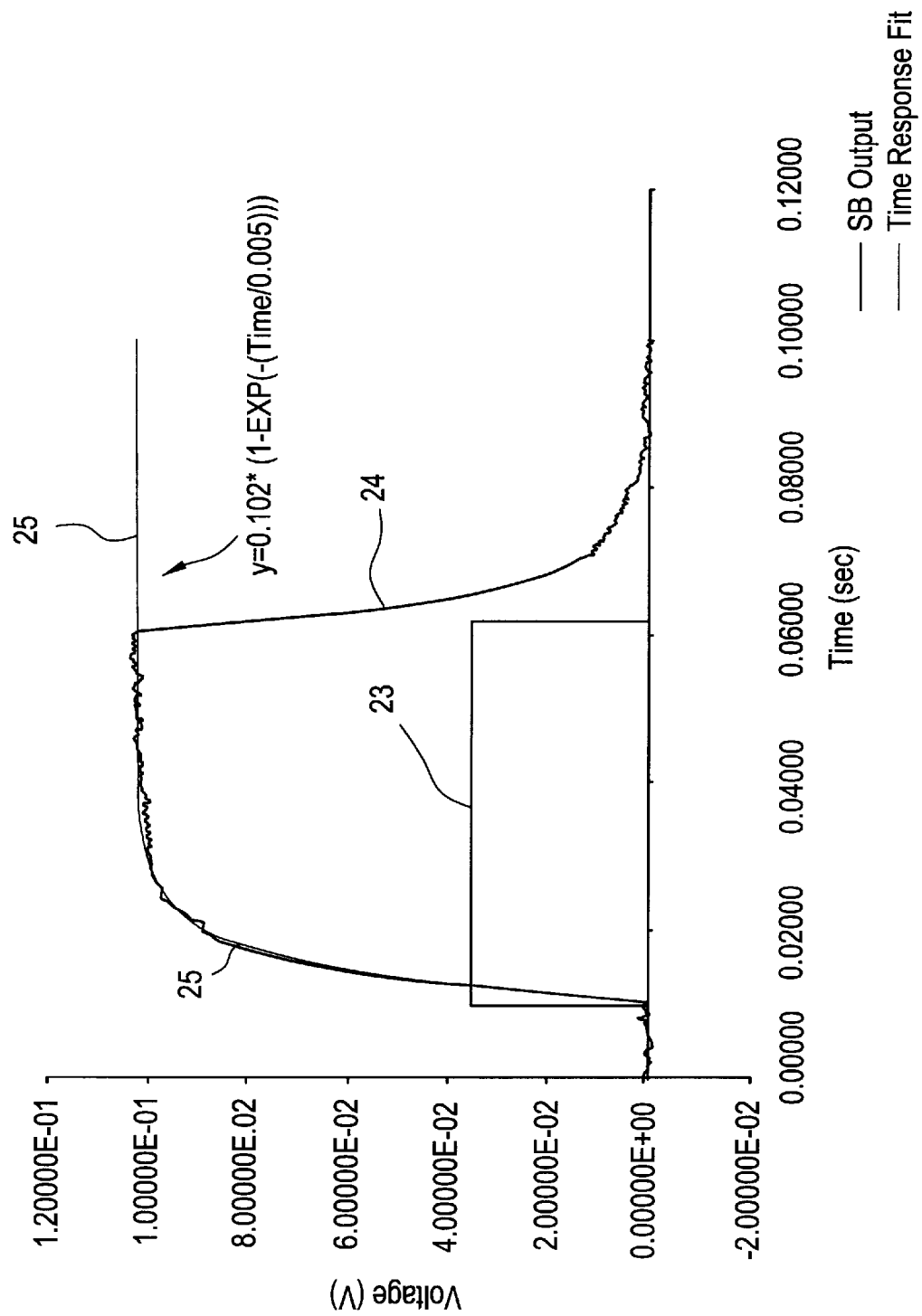
FIG. 5 is a waveform illustrating the transient response of the preferred embodiment of the invention.
Figure 6:
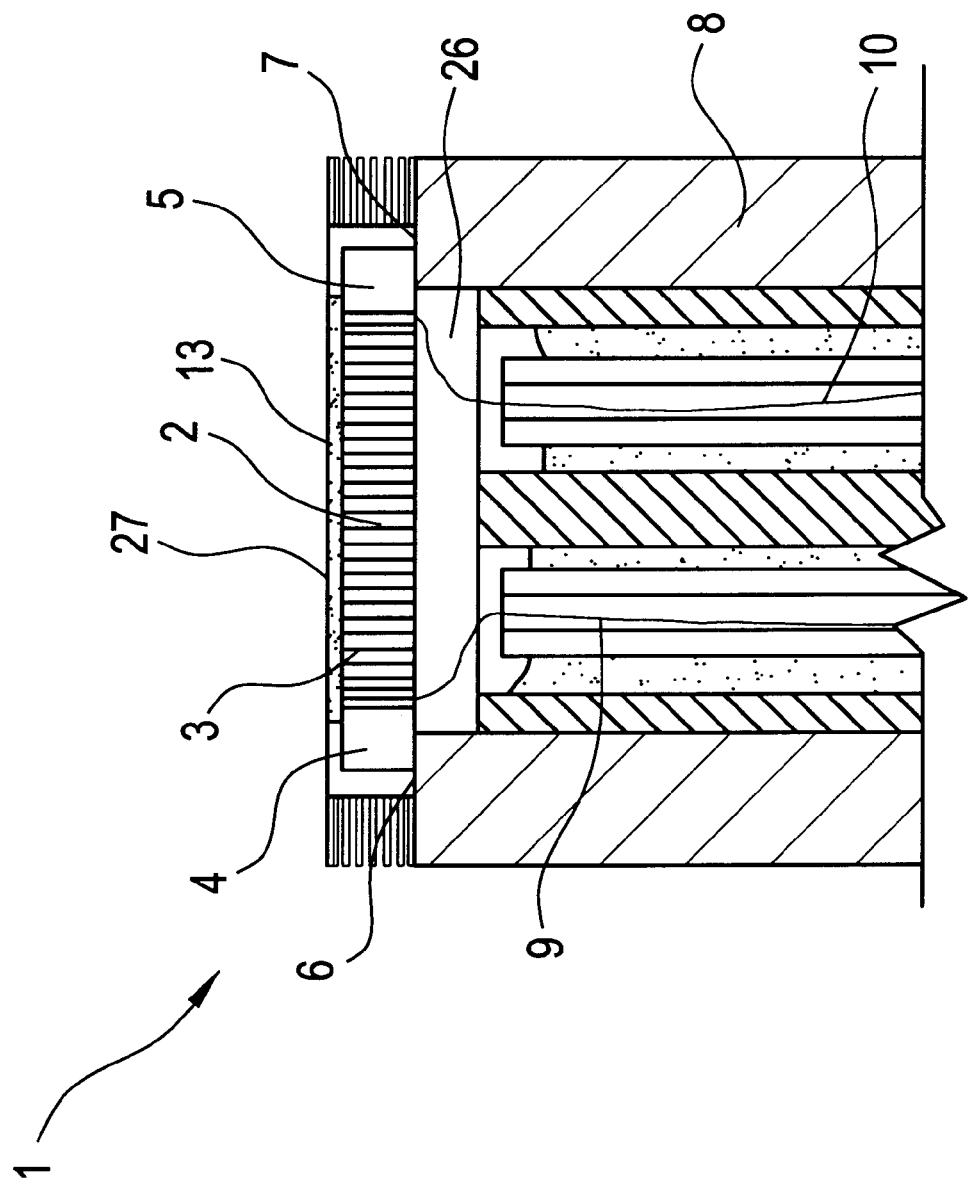
FIG. 6 is a sectional view of part of the preferred embodiment of the invention, illustrating coating with a material having high absorptivity for infrared radiation.

FIG. 5 shows the actual transient response of a Schmidt-Boelter gage fabricated according to the invention. The voltage output 23 of the laser power driver rises and falls essentially instantaneously. The heat flux output of the laser 19 rises and falls in response to this voltage with a time constant of approximately 40 microseconds. The transient response 24 of the gage 1 to the rapid rise of heat flux follows an exponential curve 25 whose characteristic rise time is 5 milliseconds.

Permissible Variations

While the preferred embodiment of the invention is described above, many variations of the gage design are possible without departing from the spirit and scope of the invention. Other types of wire may be substituted for Constantan, and other plated materials may be substituted for the pure copper. For example, the wire may be nichrome and the plating may be nickel. Gages produced with this combination would be capable of higher temperatures than those with the Constantan and copper combination indicated above.

Aluminum nitride is in many respects an ideal thermally resistant wafer material for the improved Schmidt-Boelter gage, but there are other materials which would also produce gages with useful characteristics. For example, beryllia and diamond both combine high thermal conductivity and good electrical insulation properties. Diamond would produce an extremely fast reacting gage because its thermal conductivity and diffusivity are even higher than those of copper. Gages with greater sensitivity but poorer transient response may be produced by using pure alumina or even zirconia as the thermally resistant wafer.

Since the transient response of the improved Schmidt-Boelter gage is not dependent on the thickness of the thermally resistant wafer, it is possible to change the dimensions of the wafer to achieve greater output without sacrificing transient response. The optimum ratios of wafer thickness to width and length will depend on the gage diameter, and the desired transient response and sensitivity. A complete design for any required combination can be performed with a three dimensional finite element analysis.

Any mounting method is acceptable for the thermally resistant wafer which yields good thermal contact at the ends of the wafer. The most effective method we have found to date is to mechanically wedge the wafer into a slot in the copper housing, with slight deformation of the edges of the slot. However, a bonding agent may be used, providing its thickness is of the order of 0.025 mm.

I claim:

1. A Schmidt-Boelter heat flux gage comprising:
   (a) a flat wafer formed of a thermally conducting dielectric material;
   (b) a spiral winding of a first metal on a central portion of said wafer;
   (c) a coating of a second metal applied to substantially half of each turn of said winding, defining an upper thermocouple and a lower thermocouple interconnected around an edge of said wafer;
   (d) a housing of a thermally conductive metal having thermal contact with both ends of said wafer;
   (e) said lower thermocouples being insulated from thermal contact with said housing such that to have heat sinking only at the ends of said wafer; and
   (f) means for connection of the ends of said winding to an instrument for measurement of the winding output voltage.

2. The device of claim 1 in which said wafer is formed of a material from the class that includes aluminum nitride, diamond and beryllia.

3. The device of claim 1 in which said first metal is Constantan and said second metal is copper.

4. The device of claim 1 in which said coating is electrolytically plated.

5. The device of claim 1 in which said housing is formed of a material from the class that includes copper and nickel.

6. The device of claim 1 in which said wafer is coated on one side with material having high absorptivity for infrared radiation.

* * * * *